US010007879B2

(12) United States Patent
Kakrania et al.

(10) Patent No.: US 10,007,879 B2
(45) Date of Patent: Jun. 26, 2018

(54) AUTHORING SYSTEM FOR ASSEMBLING CLINICAL KNOWLEDGE

(71) Applicant: International Business Machines Corporation, Armonk, NY (US)

(72) Inventors: Deepika Kakrania, San Jose, CA (US); Tanveer F. Syeda-Mahmood, Cupertino, CA (US); John T. Timm, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 407 days.

(21) Appl. No.: 14/723,197

(22) Filed: May 27, 2015

(65) Prior Publication Data

US 2016/0350441 A1     Dec. 1, 2016

(51) Int. Cl.
*G06F 17/30* (2006.01)
*G06N 5/02* (2006.01)

(52) U.S. Cl.
CPC ....... *G06N 5/022* (2013.01); *G06F 17/30312* (2013.01); *G06F 17/30643* (2013.01); *G06F 17/30958* (2013.01)

(58) Field of Classification Search
None
See application file for complete search history.

(56) References Cited

U.S. PATENT DOCUMENTS

| | | | |
|---|---|---|---|
| 5,555,408 A * | 9/1996 | Fujisawa | G06F 17/271 |
| 7,493,333 B2 | 2/2009 | Hill et al. | |
| 7,505,989 B2 | 3/2009 | Gardner et al. | |
| 7,836,097 B2 | 11/2010 | Blackstone et al. | |
| 2001/0049688 A1* | 12/2001 | Fratkina | G06F 17/30654 |
| 2003/0018616 A1 | 1/2003 | Wilbanks et al. | |
| 2005/0240583 A1 | 10/2005 | Li et al. | |
| 2006/0156253 A1 | 7/2006 | Schreiber et al. | |
| 2007/0208693 A1* | 9/2007 | Chang | G06F 17/30958 |
| 2008/0147788 A1 | 6/2008 | Omoigui | |
| 2012/0047179 A1* | 2/2012 | Faruquie | G06F 17/30961 |
| | | | 707/797 |
| 2013/0138592 A1 | 5/2013 | Pan et al. | |
| 2013/0275448 A1 | 10/2013 | Mirhaji | |
| 2014/0006412 A1 | 1/2014 | Singh et al. | |
| 2014/0222826 A1 | 8/2014 | DaCosta et al. | |
| 2014/0282219 A1 | 9/2014 | Haddock | |
| 2016/0299975 A1* | 10/2016 | Acar | G06F 17/30519 |

OTHER PUBLICATIONS

Zheng et al., Enabling Ontology Based Semantic Queries in Biomedical Database Systems, Proceedings of the 21st ACM International Conference on Information and Knowledge Management, 2012, pp. 2651-2654.

* cited by examiner

*Primary Examiner* — Jau-Shya Meng
(74) *Attorney, Agent, or Firm* — Lieberman & Brandsdorfer, LLC

(57) ABSTRACT

Ranking of data and retrieval of data or relationships of the data responsive to the ranking. A data model is represented as a graph, with edges in the graph linking related concepts, and an assertion represented in the graph as a reified n-ary relation. The graph is ingested though traversal and storage of the node paths. The traversal includes concepts and categories. In addition, neighborhood of one or more adjacent concepts are followed and stored in relation to the node paths. The ingested graph is converted into a set of flat document structures supported by information ranking and a retrieval framework.

20 Claims, 11 Drawing Sheets

AUTHORING SYSTEM FOR ASSEMBLING CLINICAL KNOWLEDGE

BACKGROUND

The present embodiments relate to representing data in a graph and traversing the represented data. More specifically, the embodiments relate to pre-traversing the graph to create a searchable index for the represented data.

With the advancement of technology comes the availability of data, and in some circumstances an abundance of data. In medical services, physicians need to quickly access data, assess patient information, and make patient care decisions. Clinical decision support systems are being used to rapidly analyze, summarize, and visualize data and to provide relevant recommendations.

Existing clinical knowledge bases are known in the art. These knowledge bases offer application program interfaces (APIs) to support searching the knowledge base, but are generally restricted in the types of queries that are supported.

SUMMARY

The invention includes a method, computer program product and system for structuring data and leveraging the structure for evaluation.

In one aspect, the method, computer program product, and system, a data model is represented as a graph, with the graph stored at a first memory location. The graph represents data in the form of concepts and categories. An assertion is also included in the graph as a reified n-ary relation, with the assertion represented as a node in the graph with edges linking to concepts participating in the relation. Initially, the graph is ingested, with this process including traversing the graph, flattening one or more node paths, and storing the paths. More specifically, all of the paths are followed from a current concept to a root concept, and from a category of the current concept to a root category. In addition to the path traversal, a neighborhood of the current concept is followed to an adjacent concept, also referred to herein as neighbor data, which demonstrates a non-hierarchical relationship of the current concept to a neighboring concept. The ingested graph is converted into a document index, also referred to herein as a flat document structure, which is supported by an information ranking and retrieval framework. The document index is stored at a second memory location.

These and other features and advantages will become apparent from the following detailed description of the presently preferred embodiment(s), taken in conjunction with the accompanying drawings.

BRIEF DESCRIPTION OF THE SEVERAL VIEWS OF THE DRAWINGS

The drawings referenced herein form a part of the specification. Features shown in the drawings are meant as illustrative of only some embodiments, and not of all embodiments unless otherwise explicitly indicated.

DETAILED DESCRIPTION

It will be readily understood that the components of the present invention, as generally described and illustrated in the Figures herein, may be arranged and designed in a wide variety of different configurations. Thus, the following detailed description of the embodiments of the apparatus, system, and method of the present invention, as presented in the Figures, is not intended to limit the scope of the invention, as claimed, but is merely representative of selected embodiments of the invention.

Reference throughout this specification to "a select embodiment," "one embodiment," or "an embodiment" means that a particular feature, structure, or characteristic described in connection with the embodiment is included in at least one embodiment of the present invention. Thus, appearances of the phrases "a select embodiment," "in one embodiment," or "in an embodiment" in various places throughout this specification are not necessarily referring to the same embodiment.

The illustrated embodiments of the invention will be best understood by reference to the drawings, wherein like parts are designated by like numerals throughout. The following description is intended only by way of example, and simply illustrates certain selected embodiments of devices, systems, and processes that are consistent with the invention as claimed herein.

Figure 1:
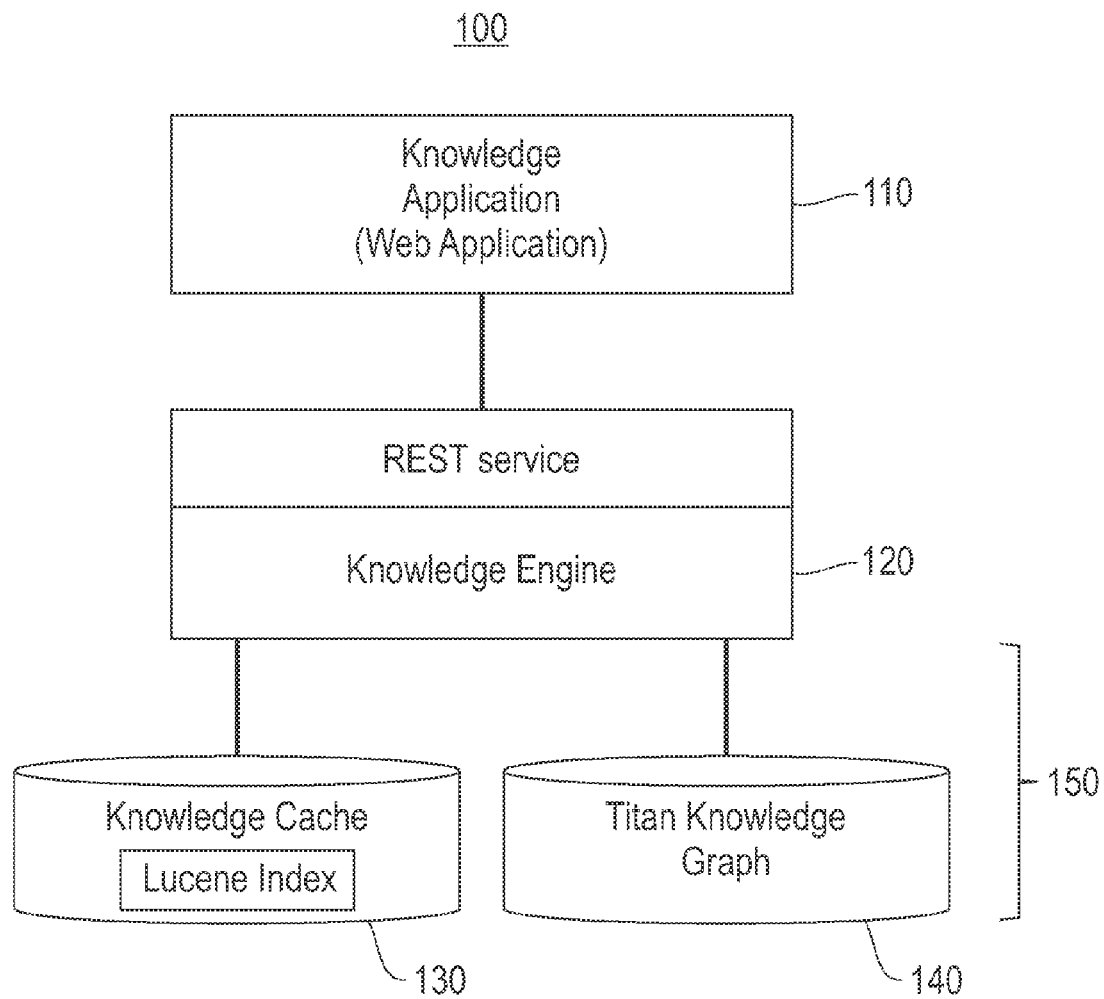
FIG. 1 depicts a block diagram illustrating the primary system components, including an application, an engine, a cache, and a graph.

With reference to FIG. 1, a block diagram (100) is provided illustrating the primary system components, including an application (110), an engine (120), a cache (130), and a graph (140). The application (110) is a system for searching, browsing, and visualizing existing data as well as inserting new data into the system. In one embodiment, the data in the system includes concepts and assertions. Assertions, generally, are assembled from existing concepts. Similarly, in one embodiment, the application (110) supports a web based query protocol. The application (110) is configured to leverage that data in the cache (130) as represented in the graph (140). The engine (120) is shown in communication with the application (110). The engine (120) functions as an interface between the application (110) and the data layer (150); the data layer (150) includes the cache (130) and the graph (140). In one embodiment, the engine includes a set of application program interfaces (APIs) that unifies access to the data in the cache (130) as represented in the graph (140). The cache (130) is a document index that maintains the hierarchy of the data as represented in graph and functions to enable searching of the data, and associated knowledge, represented in the graph. In one embodiment, the data represented in the graph (140) and correlated in the cache (130) relates to clinical knowledge, such as fields related to medicine, medical care, and associated medical research. With respect to the medical field, the graph (140) and the associated document index (130) represent a relationship of the clinical data and clinical categories, including research, and together enable evaluation of the data for researching an assertion, and creating a new assertion. Due to the structuring of the document index, referred to herein as the cache (130), efficient queries to the data is supported. The graph (140) represents the relationship among data, and the cache (130) represents a document index for query support. More specifically, the graph (140) represents and supports a hierarchical modeling of concepts and associated assertions.

Figure 2:
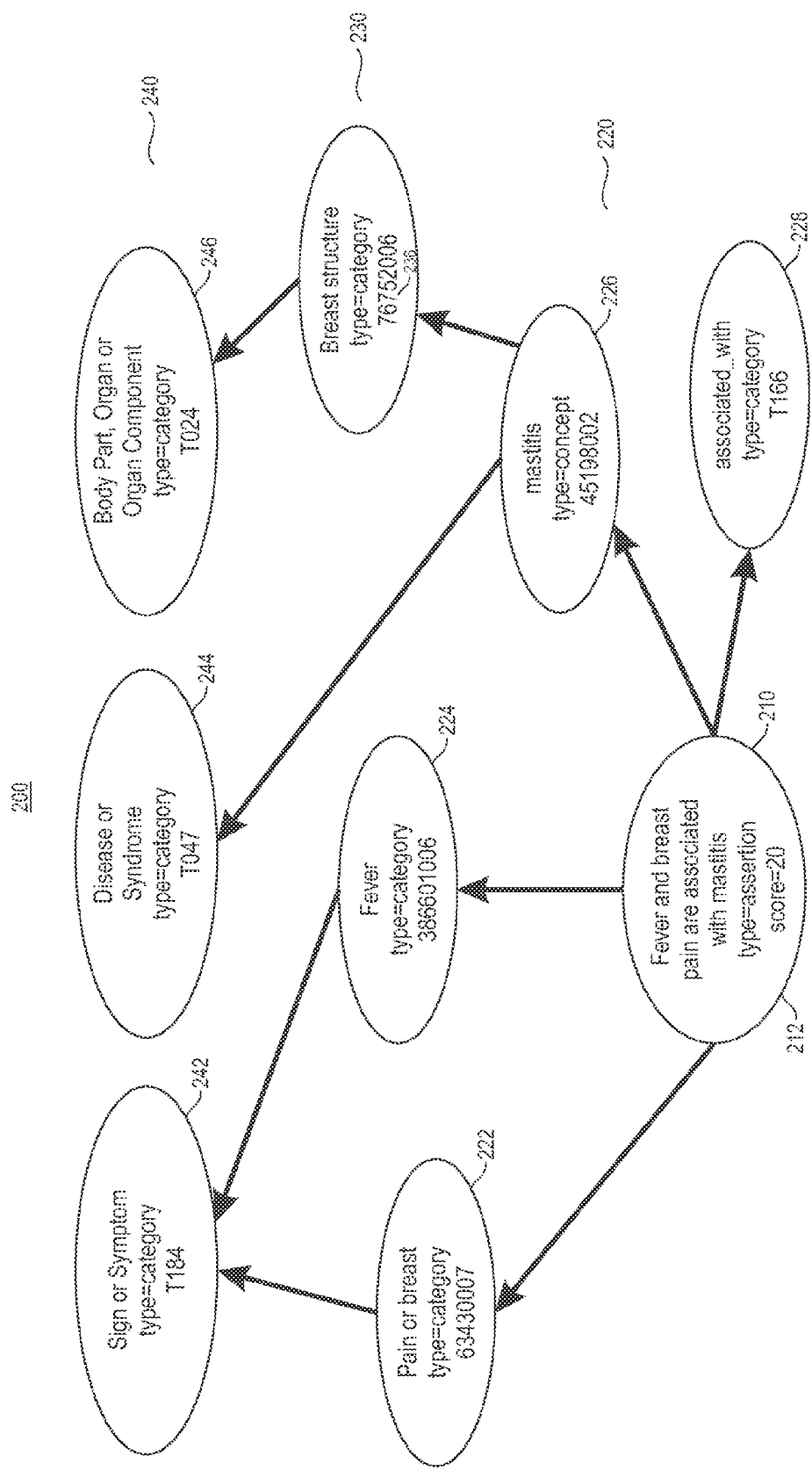
FIG. 2 depicts a block diagram illustrating a sample assertion represented using graph depicting concepts participating in an assertion.

Referring to FIG. 2, a block diagram (200) is provided illustrating a sample assertion represented using graph depicting concepts participating in an assertion. As shown, an assertion node (210) is connected to (or otherwise in communication with) concept nodes (222), (224), (226), and relation node (228). In this example, the graph shown in FIG. 2 represents a knowledge model as a property graph, including nodes and edges. The graph illustrates concepts, relations, categories, evidence, and assertions. An assertion is a reified n-ary relation represented as a node in the graph with edges linking concepts participating in the relation. Directed binary relations, in a graph, are typically represented using edges. In the case of an assertion, however, we want to represent an n-ary relation between concepts where n is greater than or equal to two (n>=2). Reification is the process of using a node (instead of an edge) to represent this type of higher order relation. The node (210) represents an assertion, which is recognized as a statement of fact or belief. At the same time, a score attribute (212) is shown associated with the node. The score (212) represents a strength of the relationship among concepts that may be represented in the graph. In one embodiment, the score has a range of 0 to 5, with a higher number in the range representing a stronger score. In one embodiment, the score is compiled from incidence statistics found from literature or mining data. In this example graph, the nodes (222), (224), and (226), each represents a concept, and node (228) represents a type of relationship. Node (236) also represents a concept. Nodes (242), (244), and (246) each represent a category.

As shown, the graph includes an assertion as supported by at least two concepts and one relation type node. The graph is a model created from one or more knowledge sources and concepts in the model represent static or slowly-changing definitional knowledge. In the example graph, the assertion node (210) is the reified relationship between concept nodes (222), (224), and (226) with node (228) defining the type of relationship between concepts represented in nodes (222), (224), and (226). Each category and concept has its own hierarchy, which ultimately derive from a root concept or category. The graph shown herein is an example of a property graph representation in which both assertions and concepts are represented as nodes of the graph with edges linking the concepts and the assertion.

Figure 3:
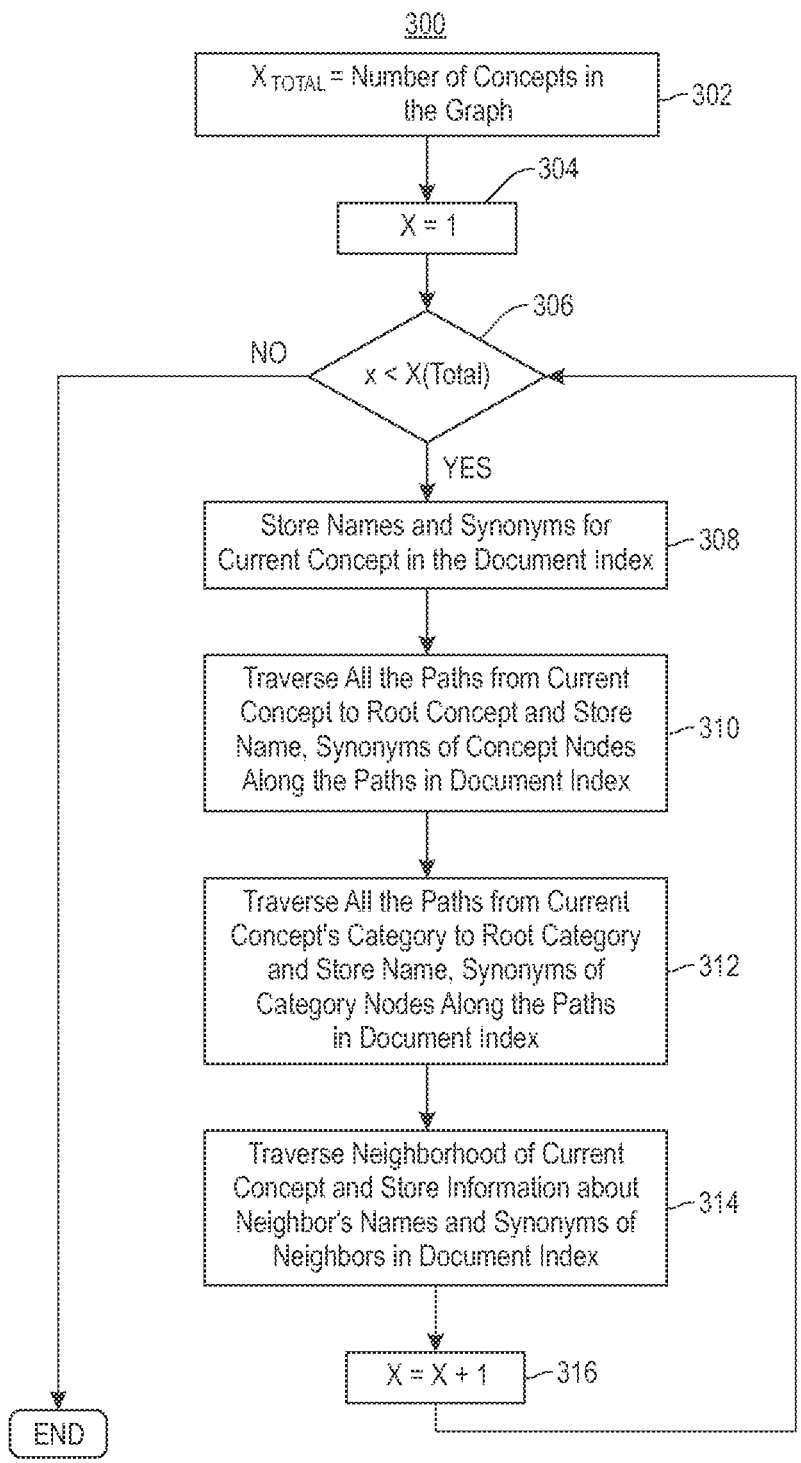
FIG. 3 depicts a flow chart illustrating a process for ingesting data represented in graph into a document index.

Referring to FIG. 3, a flow chart (300) is provided illustrating a process for ingesting the data represented in the graph, also referred to herein as a knowledge graph, into a document index, which referred to as a knowledge cache. The process shown herein initializes the document index and iterates over the represented concepts. As such, the process starts with assigning the number of concepts in the graph to the variable $X_{Total}$ (302), and initializing the concept counting variable X (304). It is then determined if the concept counting variable is less than the quantity of concepts represented in the knowledge graph (306). A negative response to the determination at step (306) concludes the data ingestion process. However, an affirmative response to the determination at step (306) is followed by storing the names and synonyms for the current concepts in the document index (308). All of the paths are traversed from the current concept to an associated root node related to the concept, and the names and synonyms of concept nodes along the paths are stored in the document index (310). In one embodiment, the traversal is referred to as a bottom up traversal of the hierarchy represented in the graph. In addition, all of the paths are traversed from the category of the current concept to an associated root category node related to the concept, and the names and synonyms of category nodes along the paths are stored in the document index (312). In one embodiment, each concept has one or more categories. Accordingly, each concept represented in the hierarchy is evaluated and stored in the document index.

Finally, the neighborhood of the current concept is traversed and information about the neighbor's names and synonyms of neighbors is stored in the document index (314). The aspect of the neighborhood traversal addresses a non-hierarchical relationship between concepts. In one embodiment, the aspect of the neighborhood association traverses the edges for immediately adjacent concepts. The neighbor data demonstrates a non-hierarchical relationship of the current concept to a neighboring concept.

Following step (314), the path counting variable, X, is incremented (316), followed by a return to step (306) As shown, the creation of the index continues through all of the concepts represented in the graph, with the index maintaining the hierarchy of the graph. By following all of the paths as represented by the path counting variable, all concepts, concept categories (or categories), and neighborhood data are ascertained and included in the index being formed. The graph traversal shown herein takes the data in the graph and models the data into the searchable index shown at (130) and referred to herein as a knowledge cache. In one embodiment, the data gathered from the traversal is formed into a flat document structure supported by an information ranking and retrieval framework, e.g. supports information and retrieval type operations, coinciding with the structure represented in the graph. A flat document structure is an alternative representation for a data structure that is typically nested, such as a tree or a graph, or even an outline. The process shown and described in FIG. 3 is also referred to as flattening. When indexing a graph, that is, taking information for the graph and storing it in a document index, there would be one document per vertex (or node) in the graph and each document would describe only information about that node. The document for a given node may contain information not just about that node but about nodes in its neighborhood. By taking a graph based structure, traversing it and storing information from that graph structure into a single document, the transformation of the graph structure into the document is referred to as flattening. The aspect of flattening describes the transformation of a data structure in computer science from something that is nested (tree-like, graph-like, etc.) to something that is more of a planar format, such as a list.

As shown in the graph depicted in FIG. 2, the root node represents an assertion. The concepts, relations, and categories represented in the graph are used to represent static or slowly changing definitional type knowledge. Assertions are used for dynamic knowledge representation that has a degree of uncertainty. In one embodiment, a new assertion may be created by assembling existing concepts in new ways.

Figure 4:
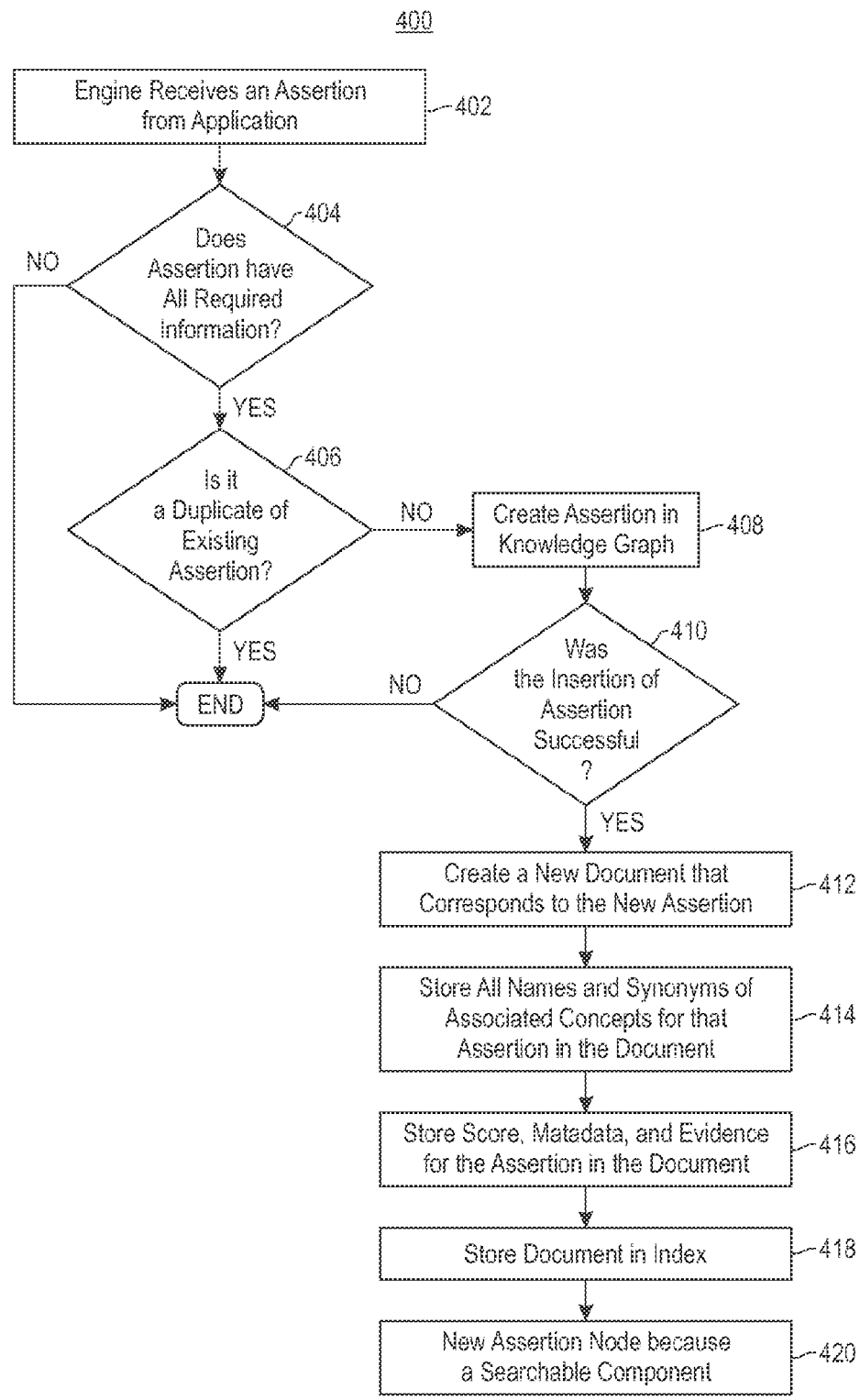
FIG. 4 depicts a flow chart illustrating a process for inserting a new assertion into the searchable document index.

The new assertion is graphically reflected as a new node in the graph and is related to two or more concept nodes and one relation type node that are already present in the graph. More specifically, creation of a new assertion node in the graph includes creating a new vertex and connecting the vertex to at least two other concept nodes in the graph via edges and one relation type node, and in addition creating an entry for the new assertion node in the corresponding index, so that the assertion as represented by the new node can be searched from the document index. Referring to FIG. 4, a flow chart (400) is shown illustrating a process for inserting a new assertion into the searchable document index. In one embodiment, two or more concepts can be selected via a search or browse of the knowledge application (110) and used to form a new assertion. In another embodiment, assertions derive from knowledge sources. The process of inserting the new assertion is an effort coordinated by the engine between the cache and the graph, both shown and described in FIG. 1. At the same time, the process of inserting a new assertion is transparent to the application. As shown, the engine is in receipt of an assertion from an application (402). The graph shown in FIG. 2 is an example of an assertion that is created from knowledge sources. The engine attempts to create the new assertion in the graph. More specifically, following the receipt of the assertion, it is determined if the assertion has all of the required information, such as two or more concepts, a relation type, etc. (404). If the response to the determination is affirmative, it is then determined if the received assertion is a duplicate of an existing assertion (406). Duplicate assertions are not represented or otherwise permitted in the graph. At the same time a represented assertion must be validated. A negative response to the determination at step (406) is followed by creating the new assertion in the knowledge graph (408). In one embodiment, the process at step (408) includes creation of the new assertion node in the graph, and connection of the new assertion node to other existing concept nodes and a relation type node. Accordingly, the process of creating a new assertion and representing the assertion in the graph requires more than insertion of the assertion into the graph.

Following the creation of the new assertion node at step (408), the process of validation of the new assertion is initiated. As shown, it is determined if an insertion of the assertion into the graph was successful (410). A negative response to the determination at step (410) reflects that the new assertion was not inserted into the structure of the data represented in the graph. Similarly, a negative response to the determination at step (404) and an affirmative response to the determination at step (406), as well as the negative response to the determination at step (410) concludes the process of inserting a new assertion into the knowledge graph without a successful insertion. Following an affirmative response to the determination at step (410), a new document that corresponds to the new assertion is created (412). All names and synonyms of the associated concepts for that assertion are stored in the document (414). In addition, score, metadata, and evidence for the assertion are stored in the document (416). The score captures the strength of a relationship between at least two concepts, and with respect to the new assertion, the score is associated with at least two concepts that are a part of the new assertion. In one embodiment, multiple scores or scoring systems could be used. The evidence captures the original source of the knowledge that is the basis for the assertion. Examples of the evidence include, but are not limited to a journal article, a textbook, etc. The new document, together with the data shown at steps (414) and (416) is stored in the index (418), and the new assertion node functions as a searchable component (420). Accordingly, new assertions are selectively entered into the graph and reflected in the document index so that the index corresponds to the state of the graph.

Figure 5:
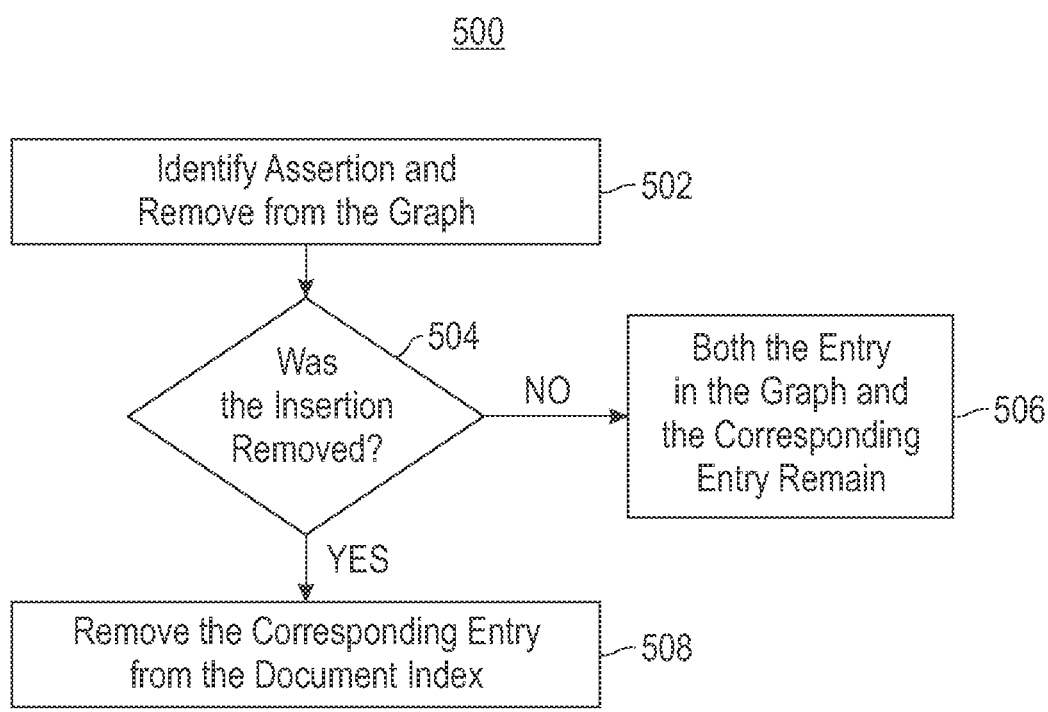
FIG. 5 depicts a flow chart illustrating a process for removing an assertion from the graph and the corresponding effect in the document index.

As shown in FIG. 4, assertions may be created and entered in the graph and associated document index entry. Just as new assertions may be created, assertions may be removed from the graph. In one embodiment, an assertion may be removed because it is determined to be false. Removal of a node from the graph includes removing a corresponding entry for the removed node from the index. Referring to FIG. 5, a flow chart (500) is provided illustrating a process for removing an assertion from the graph and the corresponding effect in the document index. As shown, the assertion is identified for removal from the graph and the removal takes place (502). It is then determined if the removal was successful (504). A positive response to the determination is followed by removing the corresponding entry from the document index (506). However, a negative response to the determination is followed by the entry in both the graph and the corresponding entry in the document index remaining (508). The process shown herein demonstrates removal of an assertion. In one embodiment, the concepts that support the removed assertion may remain in the graph and associated document index, as they may support other assertions or they may be employed in the future to support new assertions. Accordingly, the process of removing an assertion from the graph requires removal of the corresponding entry in the document index.

The process of creating and entering new assertions in the graph builds on the knowledge reflected in the graph. In one embodiment, the graph is referred to as a knowledge graph and reflects clinical medical data. For clinicians to efficiently and accurately build new clinical knowledge, it is essential for the document index to provide searching capability to support querying for existing data to ensure that duplicate information is not represented in the graph and the associated document index, to view and update the existing data, and to find missing information that needs to be entered. The search capability allows clinicians to find relevant concepts and assertions for a given search term. At the same time, as demonstrated in FIG. 4, new assertions may be constructed from existing concepts and added to the graph and corresponding document index. Accordingly, the document index is dynamic because assertions, concepts, and all supporting data may be added or removed to reflect the current state of existing source data, as reflected in the graph.

Figure 6:
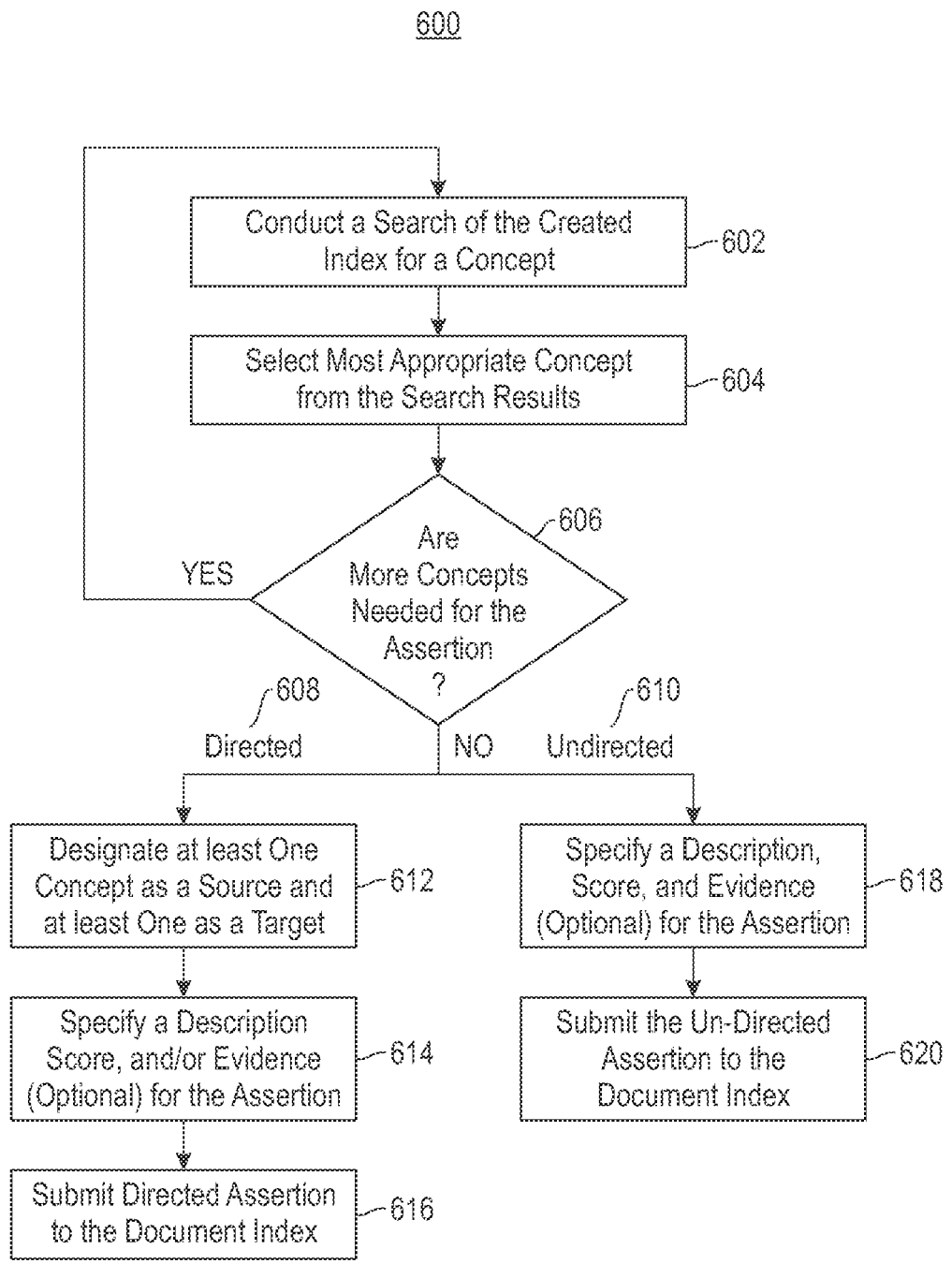
FIG. 6 depicts a flow chart illustrating a process for assembling assertions from existing concepts.

Referring to FIG. 6, a flow chart (600) is provided illustrating a process for assembling concepts into an assertion. Each assertion needs to relate to at least two concepts. As shown, a search of the created index is conducted for a concept (602). In one embodiment, search terms are provided or otherwise selected. Searching the index for both concepts and assertions may take place by different facets, including but not limited to, searching for a concept by name or synonym, searching for a concept by the name or synonym of a related concept -synonym, such as a neighbor, searching for a concept by a category hierarchy, searching for a concept by an inheritance hierarchy, such as parent, ancestor, name, or synonym, and searching for an assertion by a related concept name or synonym. In addition to the search at step (602), or one of the alternative search parameters, the most appropriate concept is selected from the search results (604). An assertion may require additional concepts. To support additional concepts, it is determined if more concepts are needs to support the assertion (606). A positive response is followed by a return to step (602) for search and selection of an additional concept. However, a negative response is an indication that the concepts in support of the assertion have been selected. The assertion may be a directed assertion (608) between source and target concepts, or the assertion may be un-directed (610). For a directed assertion (608), at least one concept is designated as a source and at least one concept is designated as a target (612). In addition, a description and a score for the assertion are specified (614). In one embodiment, evidence is optionally specified at step (614). Following step (612) the directed assertion is submitted to the document index (616). For an un-directed assertion (610), a description, score is specified for the assertion (618), In one embodiment, evidence is optionally specified at step (618). The un-directed assertion is submitted to the cache, e.g. document index, (620). As demonstrated, the process of assembling an assertion is associated with concepts and/or evidence and data supported in document index and related knowledge graph.

Figure 7:
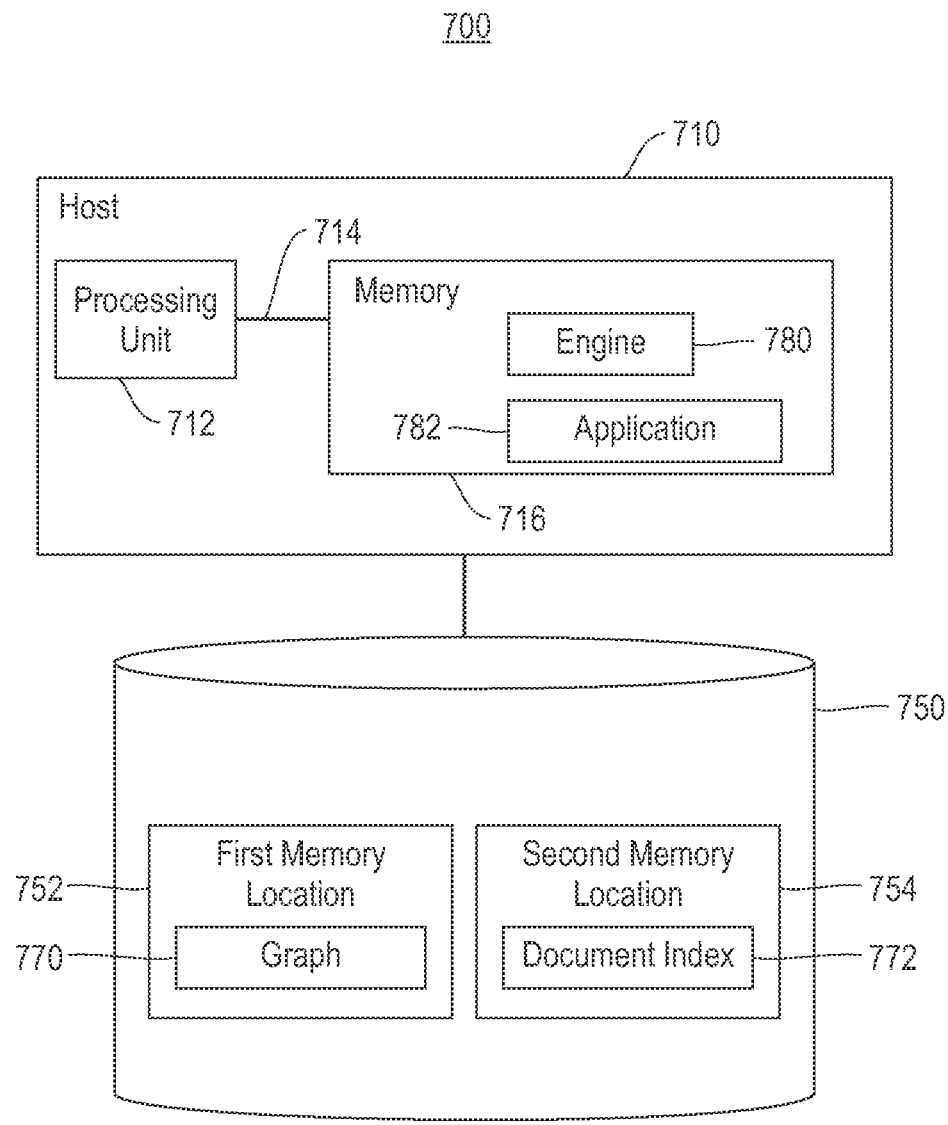
FIG. 7 depicts a block diagram illustrating hardware components of a system for supporting the graphical representation and document index described herein.

Referring to FIG. 7, a block diagram (700) is provided illustrating hardware components of a system for supporting and enabling the functionality associated with the data representation. As shown, a host (710) is provided with a processor (712), also referred to herein as a processing unit operatively coupled to memory (716) across a bus (714). The host (710) is further provided in communication with persistent storage (750). In one embodiment, storage (750) is maintained in a data center accessible by both the host (710) and other processing nodes. As shown in FIG. 1, there are four primary system components, including an application, an engine, a cache, and a graph. Both the graph (770) and the cache (772), which is also referred to herein as a document index, are shown located in storage (750). In one embodiment, the graph (770) and cache (772) are stored on separate storage devices, and in one embodiment, separate data storage locations. Similarly, in one embodiment, the graph (770) and (772) are stored on a shareable resource, such as in a cloud computing environment as described in further detail in FIGS. 8-10.

Support and leveraging of the graph (770) and the document index (772) require one or more tools in the form of an engine (780) and an application (782). As shown herein, the tools are local to memory (716), although in one embodiment, the tools may be located in communication with memory (716). Together, the tools (780) and (782) performs ingestion of the graph (770) into a document index (772), modifications to the graph (770), and reflecting those modifications in the index (772), with the modifications including adding or removing a node associated with the graph, as well as other functions as articulated and supported in FIGS. 1-5. The application (782) supports and enables searching, browsing, and visualizing existing data as well as inserting new data into the system. In one embodiment, the data in the system includes concepts and assertions. The engine (780) functions as an interface between the application (782) and the data as represented in the graphical format and the document index format, also referred to herein as the data layer. In one embodiment, the engine (780) includes a set of application program interfaces (APIs) that unifies access to the data in the cache (772) as represented in the graph (770).

The tools (780) and (782) are separately accessible. More specifically, the tools (780) and (782) are shown local to the host (710), although in one embodiment, the tools may be separately stored at different servers in a distributed resource system, and/or in a cloud sharing environment. In one embodiment, data associated with the graphical presentation is stored in a first memory location (752), and data representing the formed document index is stored in a second memory location (754). In the example shown herein, the first and second memory location is local to persistent storage device (750). In one embodiment, the memory location may be local memory, such as memory (716). In one embodiment, the application (782) is built on top of and communicates directly with the engine (780). Similarly, in one embodiment, the application (782) functions for searching and browsing existing knowledge, and for assembling new knowledge.

The system described in FIG. 7 has been labeled with tools in the form of an engine (780) and an application (782). The tools may be implemented in programmable hardware devices such as field programmable gate arrays, programmable array logic, programmable logic devices, or the like. The tools may also be implemented in software for execution by various types of processors. An identified functional unit of executable code may, for instance, comprise one or more physical or logical blocks of computer instructions which may, for instance, be organized as an object, procedure, function, or other construct. Nevertheless, the executable of the tools need not be physically located together, but may comprise disparate instructions stored in different locations which, when joined logically together, comprise the tools and achieve the stated purpose of the tool.

Indeed, executable code could be a single instruction, or many instructions, and may even be distributed over several different code segments, among different applications, and across several memory devices. Similarly, operational data may be identified and illustrated herein within the tool, and may be embodied in any suitable form and organized within any suitable type of data structure. The operational data may be collected as a single data set, or may be distributed over different locations including over different storage devices, and may exist, at least partially, as electronic signals on a system or network.

Furthermore, the described features, structures, or characteristics may be combined in any suitable manner in one or more embodiments. In the following description, numerous specific details are provided, such as examples of agents, to provide a thorough understanding of embodiments. One skilled in the relevant art will recognize, however, that the embodiment(s) can be practiced without one or more of the specific details, or with other methods, components, materials, etc. In other instances, well-known structures, materials, or operations are not shown or described in detail to avoid obscuring aspects of the embodiment(s).

Figure 8:
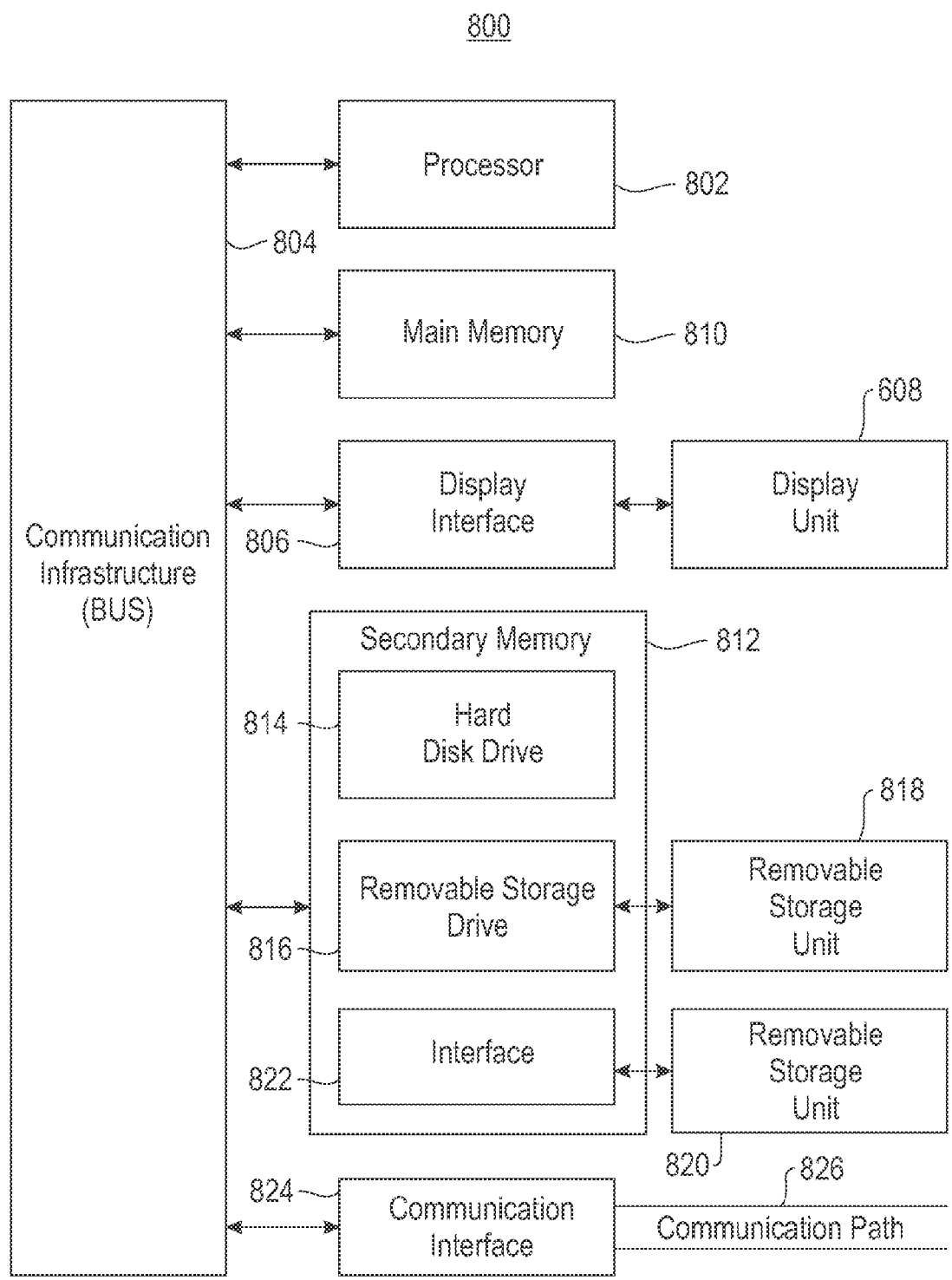
FIG. 8 depicts a block diagram of a computer system and associated components for implementing an embodiment.

Referring now to the block diagram of FIG. 8, additional details are now described with respect to implementing an embodiment. The computer system includes one or more processors, such as a processor (802). The processor (802) is connected to a communication infrastructure (804) (e.g., a communications bus, cross-over bar, or network).

The computer system can include a display interface (806) that forwards graphics, text, and other data from the communication infrastructure (804) (or from a frame buffer not shown) for display on a display unit (808). The computer system also includes a main memory (810), preferably random access memory (RAM), and may also include a secondary memory (812). The secondary memory (812) may include, for example, a hard disk drive (814) and/or a removable storage drive (816), representing, for example, a floppy disk drive, a magnetic tape drive, or an optical disk drive. The removable storage drive (816) reads from and/or writes to a removable storage unit (818) in a manner well known to those having ordinary skill in the art. Removable storage unit (818) represents, for example, a floppy disk, a compact disc, a magnetic tape, or an optical disk, etc., which is read by and written to by removable storage drive (816).

In alternative embodiments, the secondary memory (812) may include other similar means for allowing computer programs or other instructions to be loaded into the computer system. Such means may include, for example, a removable storage unit (820) and an interface (822). Examples of such means may include a program package and package interface (such as that found in video game devices), a removable memory chip (such as an EPROM, or PROM) and associated socket, and other removable storage units (820) and interfaces (822) which allow software and data to be transferred from the removable storage unit (820) to the computer system.

The computer system may also include a communications interface (824). Communications interface (824) allows software and data to be transferred between the computer system and external devices. Examples of communications interface (824) may include a modem, a network interface (such as an Ethernet card), a communications port, or a PCMCIA slot and card, etc. Software and data transferred via communications interface (824) is in the form of signals which may be, for example, electronic, electromagnetic, optical, or other signals capable of being received by communications interface (824). These signals are provided to communications interface (824) via a communications path (i.e., channel) (826). This communications path (826) carries signals and may be implemented using wire or cable, fiber optics, a phone line, a cellular phone link, a radio frequency (RF) link, and/or other communication channels.

In this document, the terms "computer program medium," "computer usable medium," and "computer readable medium" are used to generally refer to media such as main memory (810) and secondary memory (812), removable storage drive (816), and a hard disk installed in hard disk drive (814).

Computer programs (also called computer control logic) are stored in main memory (810) and/or secondary memory (812). Computer programs may also be received via a communication interface (824). Such computer programs, when run, enable the computer system to perform the features of the present embodiment(s) as discussed herein. In particular, the computer programs, when run, enable the processor (802) to perform the features of the computer system. Accordingly, such computer programs represent controllers of the computer system.

The present embodiment(s) may be a system, a method, and/or a computer program product. The computer program product may include a computer readable storage medium (or media) having computer readable program instructions thereon for causing a processor to carry out aspects of the present embodiment(s).

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present embodiment(s).

Aspects of the present embodiment(s) are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the functions/acts specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

It is understood that the teachings of the embodiments recited herein are capable of being implemented to operate in a cloud computing environment, or in conjunction with any other type of computing environment now known or later developed. Furthermore, by supporting the embodiments in the cloud computing environment, the associated tools and template may be configured for web-based support and authoring. Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 9:
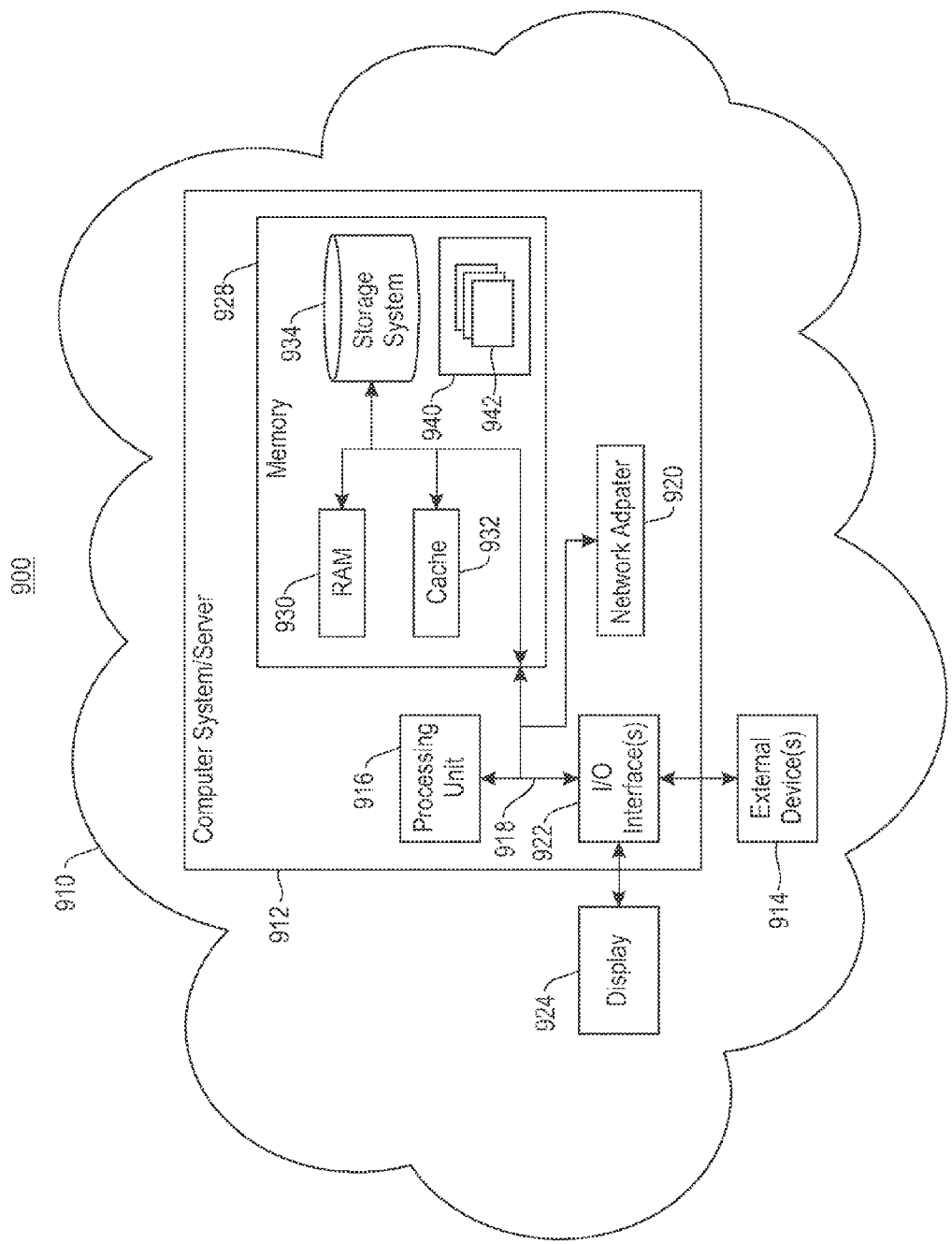
FIG. 9 depicts a schematic of an example of a cloud computing node.

Referring now to FIG. 9, a schematic of an example of a cloud computing node (900) is shown. Cloud computing node (910) is only one example of a suitable cloud computing node and is not intended to suggest any limitation as to the scope of use or functionality of embodiments of the invention described herein. Regardless, cloud computing node (910) is capable of being implemented and/or performing any of the functionality set forth hereinabove.

In cloud computing node (910) there is a computer system/server (912), which is operational with numerous other general purpose or special purpose computing system environments or configurations. Examples of well-known computing systems, environments, and/or configurations that may be suitable for use with computer system/server (912) include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server (912) may be described in the general context of computer system-executable instructions, such as program modules, being executed by a computer system. Generally, program modules may include routines, programs, objects, components, logic, data structures, and so on that perform particular tasks or implement particular abstract data types. Computer system/server (912) may be practiced in distributed cloud computing environments where tasks are performed by remote processing devices that are linked through a communications network. In a distributed cloud computing environment, program modules may be located in both local and remote computer system storage media including memory storage devices.

As shown in FIG. 9, computer system/server (912) in cloud computing node (910) is shown in the form of a general-purpose computing device. The components of computer system/server (912) may include, but are not limited to, one or more processors or processing units (9916), a system memory (928), and a bus (918) that couples various system components including system memory (928) to processor (916).

Bus (918) represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server (912) typically includes a variety of computer system readable media. Such media may be any available media that is accessible by computer system/server (912), and it includes both volatile and non-volatile media, removable and non-removable media.

System memory (928) can include computer system readable media in the form of volatile memory, such as random access memory (RAM) (930) and/or cache memory (932). Computer system/server (912) may further include other removable/non-removable, volatile/non-volatile computer system storage media. By way of example only, storage system (934) can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus (918) by one or more data media interfaces. As will be further depicted and described below, memory (928) may include at least one program product having a set (e.g., at least one) of program modules that are configured to carry out the functions of embodiments of the invention.

Program/utility (940), having a set (at least one) of program modules (942), may be stored in memory (928) by way of example, and not limitation, as well as an operating system, one or more application programs, other program modules, and program data. Each of the operating system, one or more application programs, other program modules, and program data or some combination thereof, may include an implementation of a networking environment. Program modules (942) generally carry out the functions and/or methodologies of embodiments of the invention as described herein.

Computer system/server (912) may also communicate with one or more external devices (914) such as a keyboard, a pointing device, a display (924), etc.; one or more devices that enable a user to interact with computer system/server (912); and/or any devices (e.g., network card, modem, etc.) that enable computer system/server (912) to communicate with one or more other computing devices. Such communication can occur via Input/Output (I/O) interfaces (922). Still yet, computer system/server (912) can communicate with one or more networks such as a local area network (LAN), a general wide area network (WAN), and/or a public network (e.g., the Internet) via network adapter (920). As depicted, network adapter (920) communicates with the other components of computer system/server (912) via bus (918). It should be understood that although not shown, other hardware and/or software components could be used in conjunction with computer system/server (912). Examples, include, but are not limited to: microcode, device drivers, redundant processing units, external disk drive arrays, RAID systems, tape drives, and data archival storage systems, etc.

Figure 10:
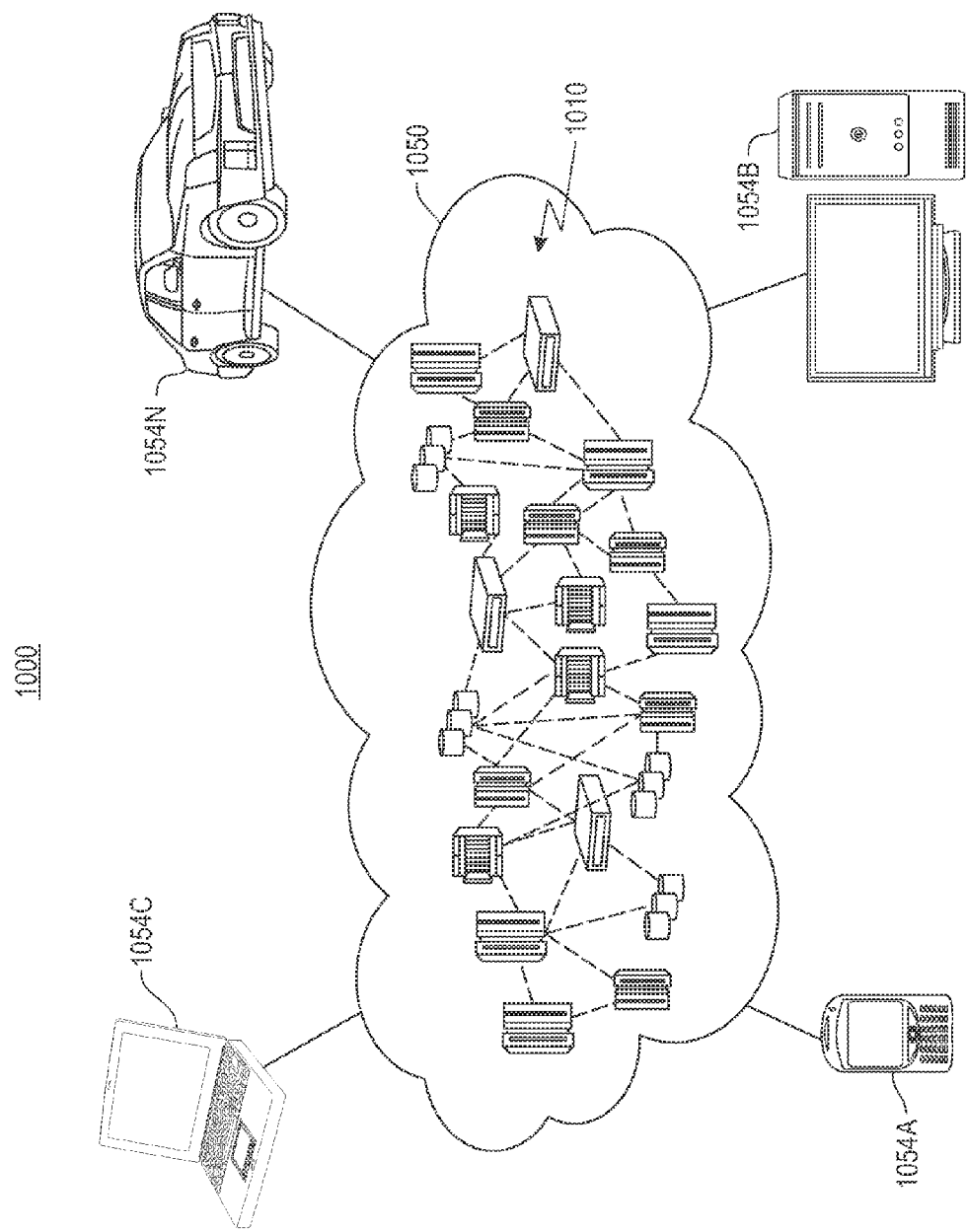
FIG. 10 depicts a block diagram illustrative of a cloud computing environment.

Referring now to FIG. 10, illustrative cloud computing environment (1000) is depicted. As shown, cloud computing environment (1050) comprises one or more cloud computing nodes (1010) with which local computing devices used by cloud consumers, such as, for example, personal digital assistant (PDA) or cellular telephone (1054A), desktop computer (1054B), laptop computer (1054C), and/or automobile computer system (1054N) may communicate. Nodes (1010) may communicate with one another. They may be grouped (not shown) physically or virtually, in one or more networks, such as Private, Community, Public, or Hybrid clouds as described hereinabove, or a combination thereof. This allows cloud computing environment (1050) to offer infrastructure, platforms and/or software as services for which a cloud consumer does not need to maintain resources on a local computing device. It is understood that the types of computing devices (1054A)-(1054N) shown in FIG. 10 are intended to be illustrative only and that computing nodes (1010) and cloud computing environment (1050) can communicate with any type of computerized device over any type of network and/or network addressable connection (e.g., using a web browser).

Figure 11:
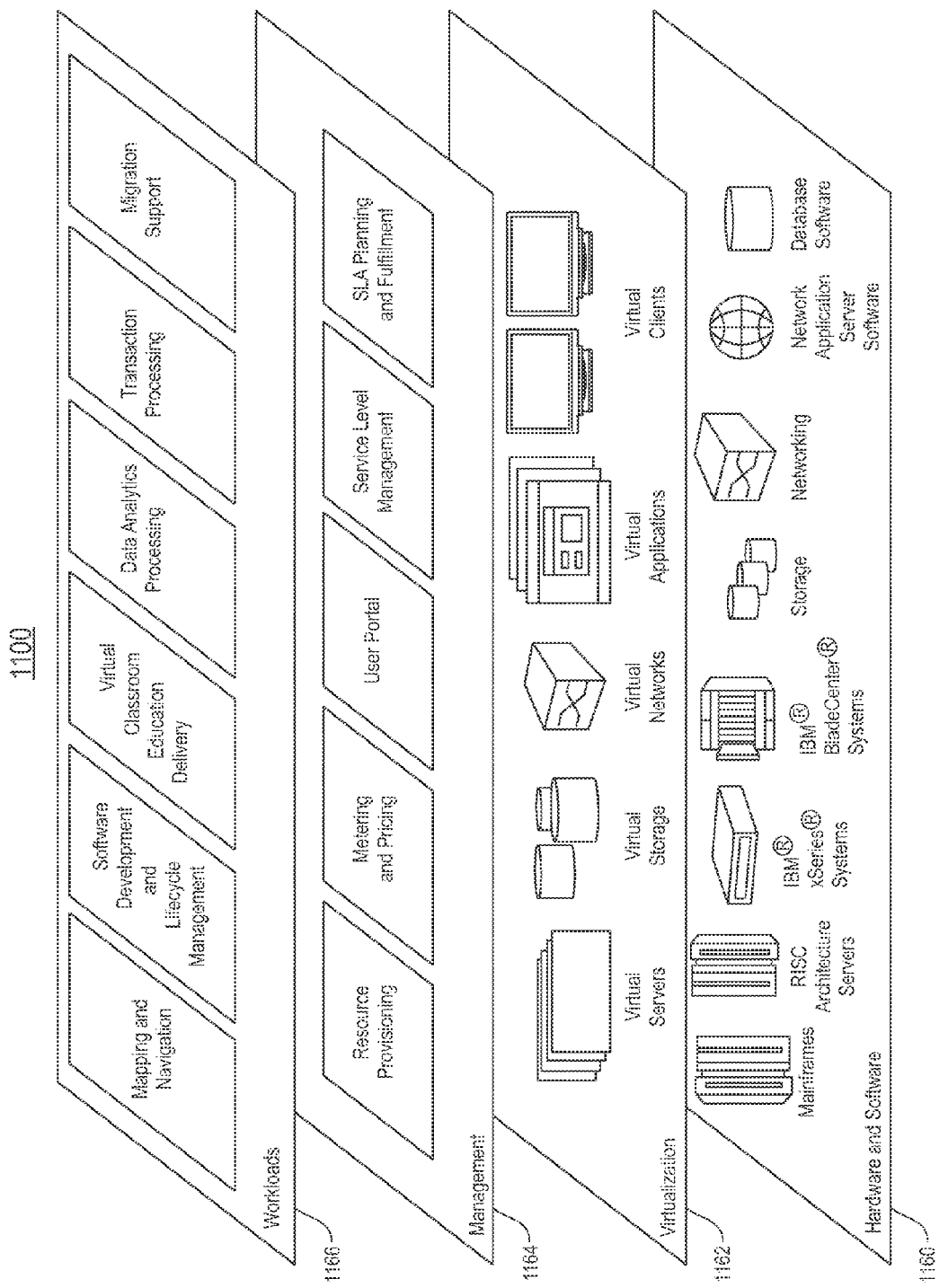
FIG. 11 depicts a block diagram illustrative of a set of functional abstraction layers provided by the cloud computing environment shown in FIG. 9.

Referring now to FIG. 10, a set of functional abstraction layers provided by cloud computing environment (1050) (FIG. 10) is shown. It should be understood in advance that the components, layers, and functions shown in FIG. 11 are intended to be illustrative only and embodiments of the invention are not limited thereto. As depicted, the following layers and corresponding functions are provided:

Hardware and software layer (1160) includes hardware and software components. Examples of hardware components include: mainframes; RISC (Reduced Instruction Set Computer) architecture based servers; servers; blade servers; storage devices; and networks and networking components. In some embodiments, software components include network application server software and database software.

Virtualization layer (1162) provides an abstraction layer from which the following examples of virtual entities may be provided: virtual servers; virtual storage; virtual networks, including virtual private networks; virtual applications and operating systems; and virtual clients.

In one example, management layer (1164) may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer (1166) provides examples of functionality for which the cloud computing environment may be utilized. Examples of workloads and functions which may be provided from this layer include: mapping and navigation; software development and lifecycle management; virtual classroom education delivery (1193); data analytics processing; transaction processing; and architecture. The primary function of the architecture is to represent a knowledge model as a graph, and ingest the model into a document structure to support both efficient retrieval of data represented in the graph and composition of new assertions associated with data represented in the graph.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated. Accordingly, the implementation of the graph and document index, together with the search and modification capabilities provides a robust platform for leveraging data and associated data representation.

It will be appreciated that, although specific embodiments of the invention have been described herein for purposes of illustration, various modifications may be made without departing from the spirit and scope of the invention. In particular, the various components can be arranged in different configuration. For example, the knowledge application can communicate directly with the knowledge graph for select operations. Accordingly, the scope of protection of this invention is limited only by the following claims and their equivalents.

We claim:

1. A computer implemented method utilizing a processor comprising:
    representing a data model as a graph, the graph stored at a first memory location, and the graph including an assertion as a reified n-ary relation represented as a node in the graph with edges linking to concepts participating in the relation, the node including a score attribute representing a strength of a relationship among concepts represented in the graph;
    ingesting the graph, including traversing the graph and flattening one or more node paths and storing the paths, the traversal comprising:
        following all paths from a current concept to a root concept;
        following all paths from a category of the current concept to a root category; and
        following a neighborhood of the current concept to an adjacent concept, wherein neighbor data demonstrates a non-hierarchical relationship of the current concept to a neighboring concept;
    converting the ingested graph into a set of flat document structures supported by information ranking and retrieval framework, including modeling data represented in the graph into a searchable index, the searchable index representing a structure of the node and edges represented in the graph, and storing the document structure at a second memory location; and
    conducting a search of the searchable index, including specifying a search concept and the score attribute to the searchable index.

2. The method of claim 1, further comprising creating a new node in the graph, the new node reflect a new assertion, including creating a new vertex in the graph and connecting the vertex to other nodes in the graph via edges, and creating an entry for the new node in the searchable index.

3. The method of claim 2, further comprising storing a name and at least one synonym for all concepts participating in the new assertion in the document structure.

4. The method of claim 2, further comprising attaching a score associated with the new assertion, wherein the score captures a strength of a relationship between at least two concepts.

5. The method of claim 2, further comprising attaching supporting evidence to the new assertion, wherein the evidence captures an original source of the new assertion.

6. The method of claim 1, further comprising removing a node from the graph, including removing a corresponding entry for the removed node from the document structure.

7. The method of claim 1, further comprising searching of two or more existing concepts represented in the graph and using the searched concepts for forming an assertion.

8. The method of claim 1, further comprising searching the searchable index, including presenting a concept search parameter selected from the group consisting of: concept name, concept synonym, a related concept name, a related concept synonym, category hierarchy, and a concept inheritance hierarchy, and combinations thereof, and an assertion search parameter selected from the group consisting of: a related concept name and a related concept synonym.

9. A computer program product comprising a computer-readable storage medium having program code embodied therewith, the program code being executable by a processor to:
represent a data model as a graph, the graph stored at a first memory location, and the graph including an assertion as a reified n-ary relation represented as a node in the graph with edges linking to concepts participating in the relation, the node including a score attribute representing a strength of a relationship among concepts represented in the graph;
ingest the graph, including a traversal of the graph and flattening one or more node paths and storing the paths, the traversal comprising:
follow all paths from a current concept to a root concept;
follow all paths from a category of the current concept to a root category;
follow a neighborhood of the current concept to an adjacent concept, wherein neighbor data demonstrates a non-hierarchical relationship of the current concept to a neighboring concept;
convert the ingested graph into a flat document structure supported by information ranking and retrieval framework, including modeling data represented in the graph into a searchable index, the searchable index representing a structure of the node and edges represented in the graph, and storing the document structure at a second memory location; and
conduct a search of the searchable index, including specify a search concept and the score attribute to the searchable index.

10. The computer program product of claim 9, further comprising the processor to create a new node in the graph, the new node reflect a new assertion, including creation of a new vertex in the graph and connect the vertex to other nodes in the graph via edges, and create an entry for the new node in the document structure.

11. The computer program product of claim 10, further comprising the processor to store a name and at least one synonym for all concepts participating in the new assertion in the document structure.

12. The computer program product of claim 10, further comprising the processor to attach a score associated with the new assertion, wherein the score captures a strength of a relationship between at least two concepts.

13. The computer program product of claim 10, further comprising the processor to attach supporting evidence to the new assertion, wherein the evidence captures an original source of the new assertion.

14. The computer program product of claim 9, further comprising removal of a node from the graph, including removal of a corresponding entry for the removed node from the document structure.

15. The computer program product of claim 9, further comprising the processor to search two or more existing concepts represented in the graph and using the searched concepts for forming an assertion.

16. The computer program product of claim 9, further comprising search of the created index, including presentation of a concept search parameter selected from the group consisting of: concept name, concept synonym, a related concept name, a related concept synonym, category hierarchy, and a concept inheritance hierarchy, and combinations thereof, and an assertion search parameter selected from the group consisting of: a related concept name and a related concept synonym.

17. A computer system comprising:
a processing unit operatively coupled to memory and a programmable hardware device;
instructions stored in the programmable hardware device and executed by the processing unit to rank data and support retrieval of the ranked data, including:
represent a data model as a graph, the graph stored at a first memory location, and the graph including an assertion as a reified n-ary relation represented as a node in the graph with edges linking to concepts participating in the relation, the node including a score attribute representing a strength of a relationship among concepts represented in the graph;
invoke an engine to ingest the graph, including the engine to traverse the graph and flatten one or more node paths and store the paths, the traversal comprising:
following all paths from a current concept to a root concept;
following all paths from a category of the current concept to a root category; and
following a neighborhood of the current concept to an adjacent concept, wherein neighbor data demonstrates a non-hierarchical relationship of the current concept to a neighboring concept;
an application in communication with the engine, the application to convert the ingested graph into a flat document structure supported by information ranking and retrieval framework, including modeling data represented in the graph into a searchable index, the searchable index representing a structure of the node and edges represented in the graph, and store the document structure at a second memory location; and
the application to support a search of the searchable index, including specifying a search concept and the score attribute to the searchable index.

18. The system of claim 17, further comprising the engine to create a new node in the graph, the new node reflect a new assertion, including creation of a new vertex in the graph and connect the vertex to other nodes in the graph via edges, and create an entry for the new node in the document structure.

19. The system of claim 17, further comprising the engine to remove a node from the graph, including removal of a corresponding entry for the removed node from the document structure.

20. The system of claim 17, further comprising the application to search two or more existing concepts represented in the graph and using the searched concepts to form an assertion.

* * * * *